(No Model.)

A. C SMITH & H. W. KING.
Combined Funnel and Measure.

No. 228,130. Patented May 25, 1880.

WITNESSES:
H. B. Brown
Amos W. Hart

INVENTOR:
A. C. Smith
H. W. King
BY
ATTORNEYS.

UNITED STATES PATENT OFFICE.

ALLEN C. SMITH AND HENRY W. KING, OF CANAAN, NEW YORK.

COMBINED FUNNEL AND MEASURE.

SPECIFICATION forming part of Letters Patent No. 228,130, dated May 25, 1880.

Application filed March 6, 1880. (No model.)

*To all whom it may concern:*

Be it known that we, ALLEN C. SMITH and HENRY W. KING, of Canaan, in the county of Columbia and State of New York, have invented a new and Improved Combined Funnel and Measure; and we do hereby declare that the following is a full, clear, and exact description of the same.

Our invention is an improvement in the class of devices which combine the functions of a measure and funnel for use in drawing off and measuring small quantities of liquids and such dry solid substances as will flow readily.

The invention is embodied in two parts, which are connected so as to form practically one measuring-funnel. Said parts are a cylinder having a tapering nozzle and mouth or receiving-opening to adapt it to serve as a funnel, and a measuring cylinder or vessel, which also has an open mouth, and is placed in the former or funnel-cylinder and pivoted in such manner that it may be tilted for the purpose of discharging its contents into the same.

The pivoted measuring-cylinder is provided with a handle and stop device for convenience of operating it and holding it fixed in position for receiving or discharging liquid or other substance contained therein.

Figure 1:
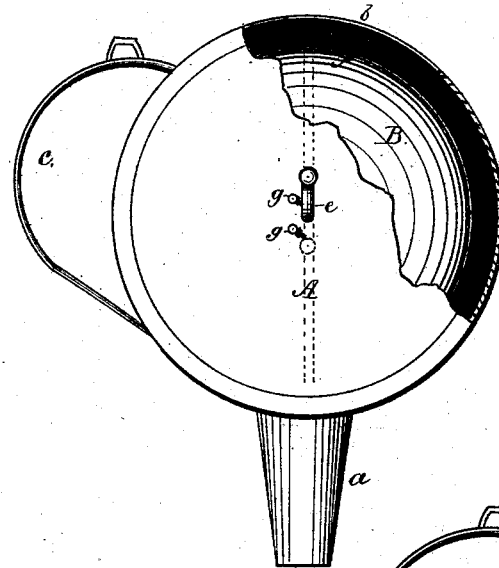
Figure 2:
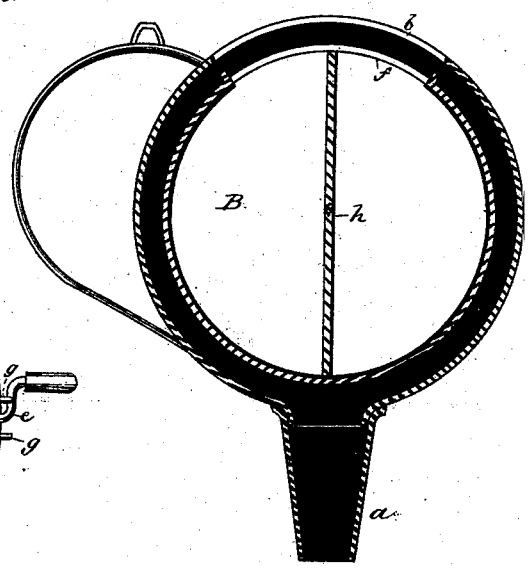
Figure 3:
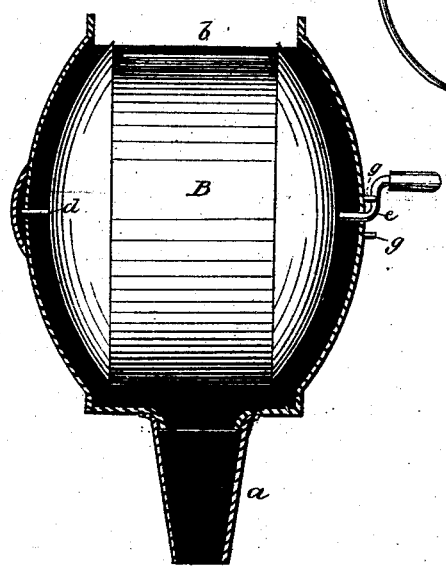

In the accompanying drawings, forming part of this specification, Figure 1 is a side view of the device, part being broken away. Figs. 2 and 3 are vertical sections in planes at right angles to each other.

The cylinder A has a tapered spout, *a*, attached to its lower side, and is provided with an opening, *b*, in its upper side, and with a handle, *c*, for convenience of holding and manipulating it. Within the cylinder A is placed the measure proper, B, which has preferably the same general contour. Said measure is provided with gudgeon *d* and crank *e*, which are attached to the center of its ends. The gudgeon enters a socket formed in or attached to one end of the funnel or cylinder A, and the crank *e* passes through the other end and serves as a handle for rotating the measure B. The latter is open at the top, *f*, to adapt it to receive the liquid or other substance to be measured.

The rotation of the measure B in either direction is arrested at the half-turn by studs *g*, fixed on the part A, contiguous to the journal portion of crank *e*.

The measure B may be constructed with or without one or more vertical transverse partitions, *h*, for dividing it into compartments of the relative size required for measuring pints, quarts, half-gallons, and gallons, according to the requirements of different users.

What we claim is—

1. A combined measuring device and funnel, consisting of a cylinder or vessel having a spout or nozzle attached, and a measuring-vessel proper, which is pivoted within the former, so that it may be rotated for discharging its contents, as specified.

2. The combination, with the open-mouthed cylinder or vessel having a nozzle attached, of the open-mouthed measuring-vessel, which is pivoted in the former, and provided with a crank and a device adapted to serve as a stop, as shown and described.

3. The combination, as shown and described, of the studs *g* and cranks *e* with the pivoted measure B and the funnel A, having open mouths, as specified.

ALLEN C. SMITH.
HENRY W. KING.

Witnesses:
WM. W. SAXTON,
WILLIAM E. BATES.